United States Patent [19]
Knowles

[11] 3,767,278
[45] Oct. 23, 1973

[54] CAGE FOR ROLLING BEARING ASSEMBLY
[75] Inventor: Elmer E. Knowles, King of Prussia, Pa.
[73] Assignee: SKF Industries, Inc., King of Prussia, Pa.
[22] Filed: Nov. 3, 1972
[21] Appl. No.: 303,423

[52] U.S. Cl. ............................................... 308/214
[51] Int. Cl. ............................................ F16c 33/00
[58] Field of Search ..................... 308/214, 212, 213

[56] References Cited
UNITED STATES PATENTS
1,349,307   8/1920   Winn .................................. 308/214

Primary Examiner—Charles J. Myhre
Assistant Examiner—Frank Susko
Attorney—Dexter N. Shaw et al.

[57] ABSTRACT

A cage for a rolling bearing having inner and outer ring members spaced apart to define an annular space for a plurality of rolling elements comprising an annular body portion having a plurality of pockets for the rolling elements, one of said ring members having a circumferential groove spaced inwardly from the axial end face thereof to define a circumferential rib, at least one entrance slot in said rib communicating with said groove, said cage having at least a pair of lugs projecting radially from said body portion, said lugs, entrance channel and groove being of a predetermined dimensional relationship so that when a lug is aligned with said entrance slot the cage can be moved axially so that said lugs engage in said groove whereby upon relative rotation of said cage and ring the lugs confront said rib to prevent axial movement of said cage relative to said one ring.

6 Claims, 4 Drawing Figures

Patented Oct. 23, 1973 3,767,278

CAGE FOR ROLLING BEARING ASSEMBLY

The present invention relates to rolling bearings and more specifically to a new and improved cage design especially adapted for rolling bearing assemblies having tapered rollers.

These rolling bearing assemblies usually comprise an inner ring or cone, an outer ring or cup, the inner and outer ring being provided with confronting conical raceways which are spaced apart to define an annular space for a plurality of rolling elements, for example tapered rollers. The cone is provided with a shoulder confronting one axial end face of the rollers to limit axial movement of the rollers relative to the cone in one axial direction. The bearing assembly also includes a cage for circumferentially spacing the rollers.

In bearing assemblies of this type, means is provided for limiting axial movement of the rollers relative to the cup and cone in the other axial direction. In some instances the cage is provided with a plurality of radial lugs which are engaged by a securing ring mounted on the cone or cup. Usually a groove or recess is provided in the cup or cone for receiving the securing rings which are force-fitted therein. This procedure is somewhat time consuming and requires additional machining operations on the cone or cup and also in some instances may result in work hardening or harmful deformation of the cup or cone. In other instances, the cage has generally axially oriented arms which after assembly of the rollers are deformed to engage in a groove formed in the cup or cone. This also adds another step to the operation of assembling the bearing, and may result in damage to the rolling elements or the cone upon deformation or peening of the cage arms.

With the foregoing in mind, an object of the present invention is to provide a more simplified bearing assembly wherein all of the parts of the bearing assembly may be assembled without deforming any of the parts thereof thereby eliminating possible damage or work hardening of any of the parts such as the raceways or the rolling elements. In accordance with the present invention, the cage has a plurality of circumferentially equi-spaced radially directed retaining lugs and one of the annular members such as the cup or cone is provided with a predetermined number of entering slots of a number one less than the number of lugs, the entering slots having a circumferential spacing equal to the circumferential spacing of adjacent lugs of the cage. The entering slots lead to a circumferential retaining groove located adjacent one axial end of the cup or cone and forming a retaining rib at the one axial end. The outside diameter of the rib is larger than the bore diameter of the retaining lugs and the diameter of the retaining groove is such that while for example two of the retaining lugs engage on the bottom of the entering slots, the third will pass over the rib outer diameter. All three lugs then will be inside the retaining groove when the assembly is complete. A bearing assembly incorporating a cage constructed in accordance with the present invention greatly simplifies the task of assembling the various elements thereof. For example, with the cage of the present invention, the cage and tapered rollers may be initially assembled as a unit and thereafter the cone slid axially in place with two of the three lugs of the cage registering with two entering slots on the cone whereby the third lug clears the rib at the inner axial end of the cone. When the cage has cleared the rib, and the lugs are engaging in the retaining groove, the cage and cone are simply rotated relative to one another whereby all of the lugs confront the inner face of the rib, thereby retaining the rollers against axial movement in that direction. By this arrangement, the necessity of spreading open cages prior to assembly as well as a final closing operation are eliminated and the assembly and disassembly are achieved with relative ease.

In the present tapered roller bearing designs, the roller set is difficult to disassemble from the cone for inspection purposes. Visual inspection of the raceway areas is necessary, and is greatly facilitated by a cage design of the present invention wherein the cage and cone simply have to be rotated relative to one another until the lugs are in registry with the entering slots thereby permitting the cone to be withdrawn for inspection of the raceway.

These and other objects of the present invention and the various features and details of the operation and construction thereof are hereinafter more fully set forth with reference to the accompanying drawings, wherein.

Figure 1:
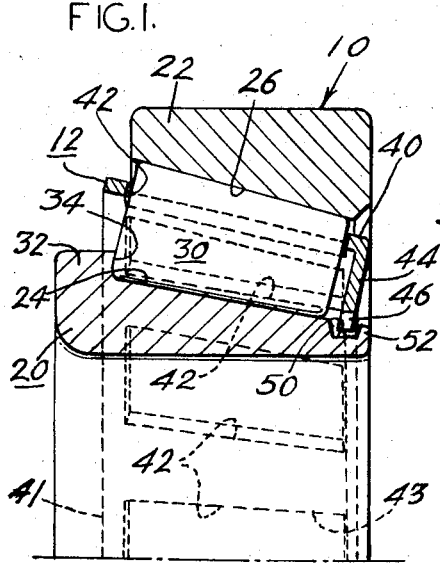
FIG. 1 is a fragmentary sectional view of a rolling assembly incorporating improved cage design of the present invention.

Referring now to the drawings, there is illustrated a bearing assembly generally designated by the numeral 10 incorporating a cage 12 constructed in accordance with the present invention.

The bearing assembly 10 is one incorporating tapered rolling elements and comprises an inner annular member or cone 20, and an outer annular member or cup 22, the annular members being provided with confronting conical raceways 24 and 26 respectively. The raceways are spaced apart to define an annular space for a plurality of rolling elements, in the present instance tapered rollers 30, which are circumferentially spaced apart by the cage 12. The cone 20 has a circumferentially extending radially directed lip 32 at one axial end defining a shoulder 34 to limit axial movement of the rollers 30 in one axial direction. The large diametral rib of the cone also functions to guide the rolling elements since there is a force component which urges the rollers against the flange thereby effecting rolling of the rolling elements in true orientation with the axis of rotation.

In accordance with the present invention, the cage 12 and cone 20 are designed in a manner permitting easy and quick assembly of the rollers 30 without deforming any portions of the cage. The present design eliminates the necessity of spreading any portions of the cage prior to assembly as well as a final closing operation so that the assembly of the entire bearing is greatly simplified. To this end, the cage 12 consists of a circumferentially extending frusto-conical annular portion 40 having a plurality of circumferentially equi-spaced windowlike openings 42 for accommodating the rollers 30 and a generally radially directed flange 44 at one axial end which in the present instance extends normal to the frusto-conical annular portion 40. As illustrated in FIG. 1, the frusto-conical annular portion 40 of the cage consists of a pair of circumferentially extending rails 41 and a plurality of cross pieces 43 extending between the rails and circumferentially spaced to define the windowlike openings or pockets 42 or the rolling elements. Even though the flange 44 is shown and described as being perpendicular to the annular portion 40 of the cage, it is to be understood that the flange may extend at various angles depending on the geometry of the various parts of the bearing assembly. In the illustrated embodiment, the flange 44 projects radially inwardly relative to the frusto-conical portion 40 and is formed with a plurality of radially inwardly projecting lugs 46, in the present instance, three circumferentially equispaced lugs 46.

The cone 20 is formed with a circumferential groove 50 at its inner axial end remote from the lip 32, the groove 50 defining a circumferentially extending rib 52 at the extreme outer axial end of the cone 20. There is formed in the rib 52, entering slots 54 of a sufficient width and configuration to receive and permit passage therethrough of the lugs 46. To this end, the entering slots have tapered side walls of a spacing slightly greater than the tapered side edges of the lugs 46. Even though in the illustrated embodiment the lugs 46 are slightly tapered and the entering slots 54 are likewise bevelled, it is to be understood that the lugs and slots may have a different geometric shape. In the illustrated embodiment of the invention there are two entering slots 54 which are circumferentially spaced apart an angular distance C equal to the angular distance $C_1$ between adjacent lugs 46. The entering slots 54 are spaced apart an angular distance of 60°; that is, an identical angular distance to that of adjacent lugs 46 on the cage. Additionally, the diameter D of a circular trace through the inner edges of the lugs 46 is less than the diametral distance $D_2$ of the peripheral edge of the lip 52 and slightly greater than a diametral distance $D_3$ which is the distance from the bottom of one of the entering slots to the outer edge of the lip 52. By this relationship, the outside diameter of the rib 52 is larger than the bore diameter D of the retaining lugs 46; however, the diameter $D_4$ of the retaining groove 50 is such that while two of the retaining lugs are resting on the bottom of the groove 50, the third will pass over the outer diameter of the lip 52.

Figure 2:
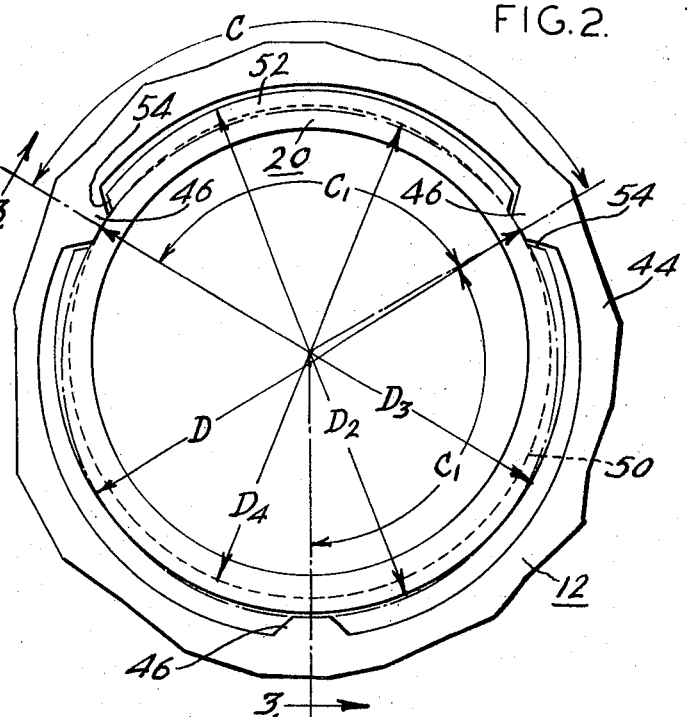
FIG. 2 is a fragmentary axial end view.
Figure 3:
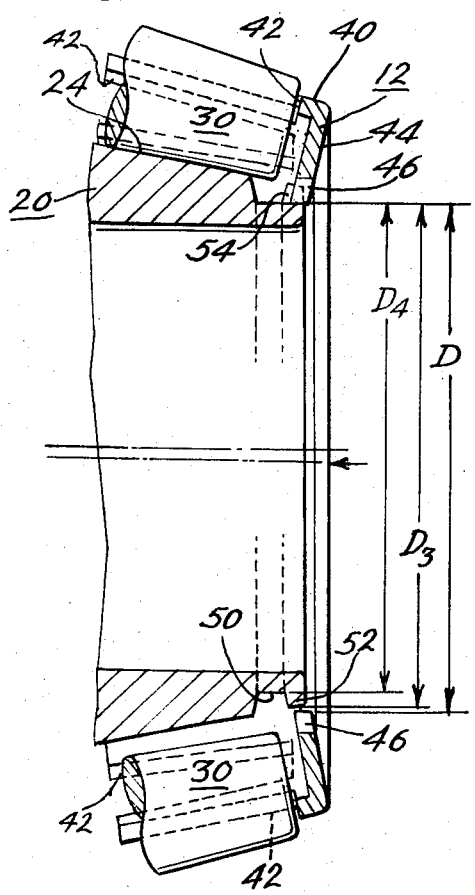
FIG. 3 is a sectional view taken on lines 3—3 of FIG. 2 showing the cage in partial assembled relation.
Figure 4:
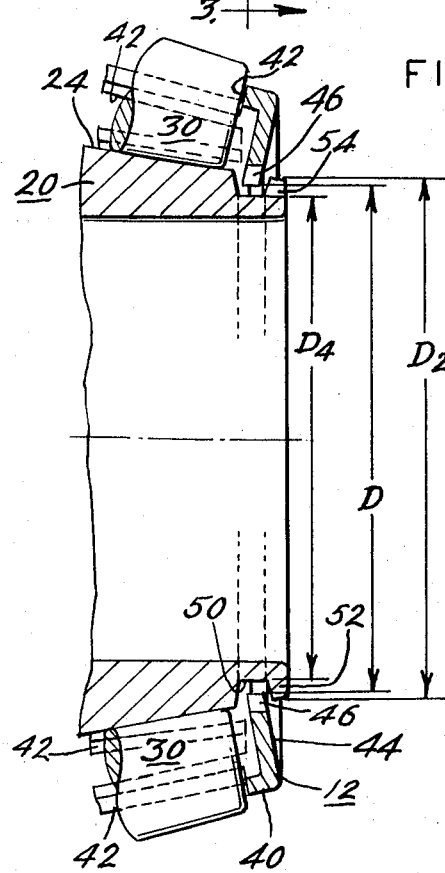
FIG. 4 is a view similar to FIG. 3 showing the cage fully assembled.

By this arrangement, the elements of the bearing assembly may be easily assembled without the necessity of spreading open any portions of the cage prior to assembly or a final closing in operation. More specifically, the elements of the bearing assembly are put together in this manner. The rollers 30 and cage 12 are assembled as a unit and then the cone 20 is slid into place axially with the two lugs 46 on the cage aligned with the entering slots 54 and the cage displaced downwardly with respect to FIG. 2 so that the lower lug passes over the outer edge of the rib 52. The cone is then displaced further axially to the position shown in FIG. 4 and the cage and cone rotated slightly so that the lugs are displaced from the entering slots thereby confronting the inside shoulder of the rib 52 and limiting axial movement of the rollers in that direction.

The cage design of the present invention provides several distinct advantages over prior art arrangements. For example, initial assembly of elements of the bearing assembly is greatly simplified eliminating the need of spreading open cages prior to assembly as well as final closing operations. This also minimizes the danger of damage to parts of the bearing during initial assembly. Periodic inspection of the bearing is greatly facilitated by reason of the fact that none of the parts have to be forceably altered. Additionally, since grinding of the cone raceway is simplified by reason of the fact that the rib lies in a plane below the raceway.

I claim:

1. A cage for a rolling bearing having inner and outer ring members spaced apart to define an annular space for a plurality of rolling elements comprising an annular body portion having a plurality of pockets for the rolling elements, one of said ring members having a circumferential groove spaced inwardly from the axial end face thereof to define a circumferential rib, at least one entrance slot in said rib communicating with said groove, said cage having at least a pair of lugs projecting radially from said body portion, said lugs, entrance channel and groove being of a predetermined dimensional relationship so that when a lug is aligned with said entrance slot the cage can be moved axially so that said lugs engage in said groove whereby upon relative rotation of said cage and ring the lugs confront said rib to prevent axial movement of said cage relative to said one ring.

2. A cage as claimed in claim 1 wherein the groove is located in the inner ring and said cage includes a circumferential flange projecting from said body portion, said lugs being formed in the inner terminal edge of said flange.

3. A cage as claimed in claim 1 wherein said entering slot has tapered side walls and each of said lugs has tapered side edge portions complementing the tapered side walls of said slot.

4. A cage as claimed in claim 1 including a pair of entering slots circumferentially spaced apart a predetermined angular distance and wherein said cage has three lugs circumferentially spaced apart, adjacent ones of said lugs being circumferentially spaced an angular distance equal to the predetermined angular distance of said slots.

5. A cage as claimed in claim 4 wherein the diameter of a circular trace through the inner edges of said lugs is less than the diametral distance of the outer peripheral edge of said rib and slightly greater than a diametral distance from the bottom of one of said entering slots to the outer edge of said rib.

6. A tapered rolling bearing assembly comprising a cone and cup having inner and outer frusto-conical raceways spaced apart to define an annular space for a plurality of tapered rollers, said cone having a circumferential groove spaced inwardly from an axial end face thereof to define a circumferential rib, at least one entrance slot in said rib communicating with said groove, said cage having at least a pair of lugs projecting radially from said body portion, said lugs, entrance channel and groove being of a predetermined dimensional relationship so that when a lug is aligned with said entrance slot the cage can be moved axially so that said lugs engage in said groove whereby upon relative rotation of said cage and ring the lugs confront said rib to prevent axial movement of said cage relative to said one ring, said rib having a radial projection below the plane of said cone raceway.

* * * * *